R. W. TAVENER.
Manufacture of Medicated Beer.
No. 161,574. Patented March 30, 1875.
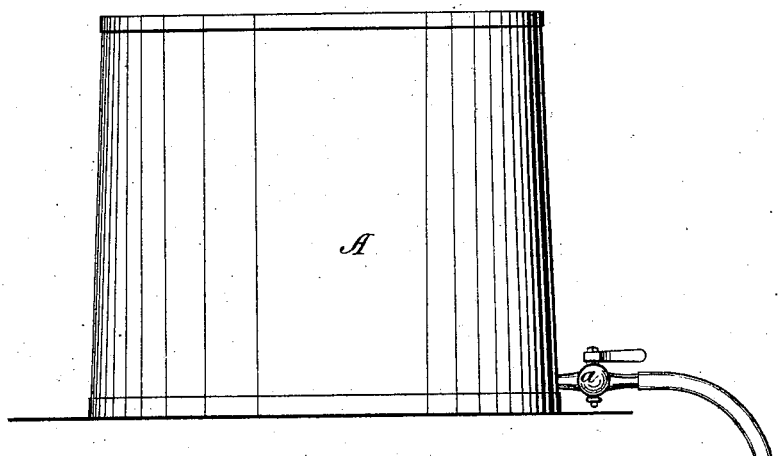
Fig. 1.
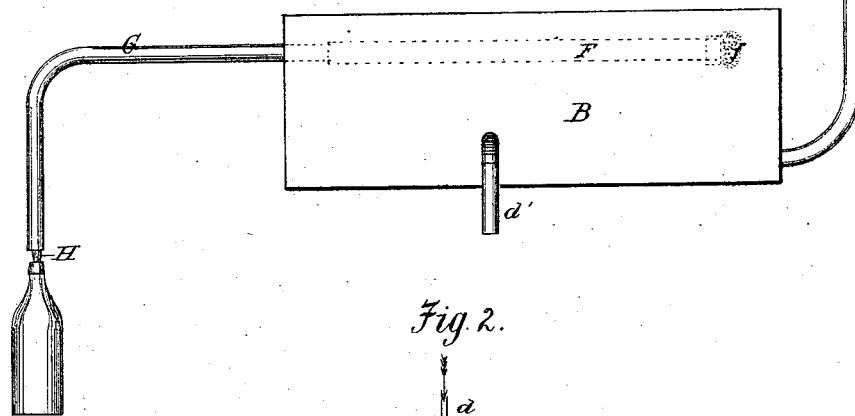
Fig. 2.
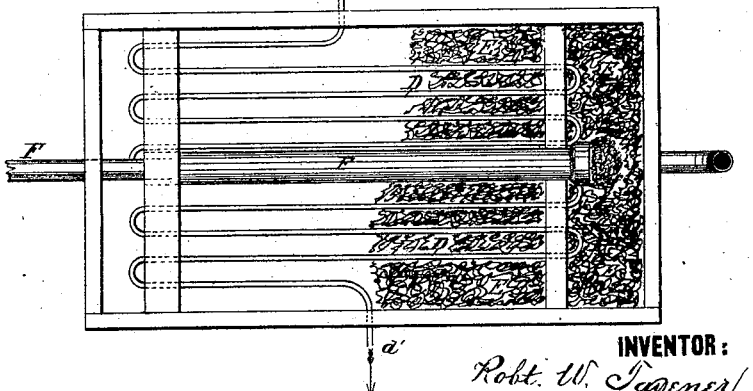

UNITED STATES PATENT OFFICE.

ROBERT W. TAVENER, OF BAY CITY, MICHIGAN.

IMPROVEMENT IN THE MANUFACTURE OF MEDICATED BEER.

Specification forming part of Letters Patent No. 161,574, dated March 30, 1875; application filed February 24, 1875.

*To all whom it may concern:*

Be it known that I, ROBERT W. TAVENER, of Bay City, in the county of Bay and State of Michigan, have invented a new and useful Improvement in the Manufacture of Medicated Beer; and I do hereby declare that the following is a full, clear, and exact description of the same, reference being had to the accompanying drawing, forming a part of this specification, in which—

Figure 1 is a side elevation of my apparatus. Fig. 2 is a top view of the purifier of the same.

The invention will first be fully described, in connection with all that is necessary to a full understanding thereof, and then pointed out in the claims.

I take, preferably, water, thirty-two gallons; bloodroot, two ounces; Irish moss, one pound; sarsaparilla root, four ounces; marsh-mallow root, eight ounces; cream tartar, one-half pound; sugar, twenty-two pounds; oil of fireweed, one-half ounce; hop-yeast, one quart. The Irish moss, with the water, is boiled in a porcelain kettle for about half an hour, and the bulk of the decoction drawn off into the vat A. The bloodroot, sarsaparilla, and marsh-mallow roots are next boiled for about three-quarters of an hour in some of the Irish-moss liquid and mixed with the sugar, when this also is drawn into the vat, leaving in the bottom of kettle some sugar. Upon the latter is poured one-half ounce of the oil of sassafras and fire-weed, and when cool the hop-yeast and cream of tartar. This is then, together with a dozen eggs, stirred into the contents of the vat. After this operation the net aggregate of liquid will be about thirty-two gallons, which is now ready to be brewed for eighteen to twenty-four hours.

B represents a purifier, connected with vat A by the faucet $a$ near its bottom, and by the pipe C. The contents of the vat are thus drawn more or less slowly into the purifier, and enter beneath the steam-coil D, which is provided with inlet and outlet $d$ $d'$, and whose intervals are packed with sponge E. The sugar is thus rarefied by heat and passed through the sponge, wherein is absorbed its impurities. It then works its way through the sponge plug $f$ and into the pipe F; thence, through the rubber pipe G, into the nozzle H, that conveys it into the bottles.

This beer is found, by practical experiment, not to be intoxicating or productive of headaches, like other beverages, but is tonic and cooling in its character, purifying the blood, and sustaining the system against cholera and other epidemic diseases. It is, moreover, especially soothing to the nervous system, and rapidly improving to its tone, so as speedily to eradicate neuralgia and other nervous ailments.

Having thus described my invention, what I claim as new is—

1. A brewers' compound for the manufacture of cooling and tonic beverages, formed of the ingredients specified, prepared in the manner set forth.

2. An apparatus consisting of the connected vat and purifier A B, the latter provided with heating-coil and absorbent, as and for the purpose described.

ROBERT W. TAVENER.

Witnesses:
J. M. MILLER,
JOHN Y. MCKINNEY.